(12) United States Patent
Park

(10) Patent No.: US 7,870,186 B2
(45) Date of Patent: Jan. 11, 2011

(54) CONTENTS RECEIVING APPARATUS AND RECORDING MEDIUM FOR STORING PROGRAM THEREOF

(75) Inventor: Tae-Ha Park, Seoul (KR)

(73) Assignee: Solution Box, Inc., Seoul (KR)

( * ) Notice: Subject to any disclaimer, the term of this patent is extended or adjusted under 35 U.S.C. 154(b) by 423 days.

(21) Appl. No.: 11/576,754

(22) PCT Filed: Oct. 2, 2006

(86) PCT No.: PCT/KR2006/003983

§ 371 (c)(1),
(2), (4) Date: Apr. 5, 2007

(87) PCT Pub. No.: WO2007/040338

PCT Pub. Date: Apr. 12, 2007

(65) Prior Publication Data

US 2008/0065643 A1    Mar. 13, 2008

(30) Foreign Application Priority Data

Oct. 4, 2005 (KR) ............... 10-2005-0092909

(51) Int. Cl.
G06F 15/16 (2006.01)
(52) U.S. Cl. .................................................. 709/202
(58) Field of Classification Search ............. 709/202, 709/219; 725/46
See application file for complete search history.

(56) References Cited

U.S. PATENT DOCUMENTS

| 6,345,297 | B1* | 2/2002 | Grimm et al. ............... 709/227 |
| 6,986,154 | B1* | 1/2006 | Price et al. .................... 725/46 |
| 7,594,244 | B2* | 9/2009 | Scholl et al. .................. 725/46 |
| 2002/0120574 | A1 | 8/2002 | Ezaki |
| 2003/0078986 | A1* | 4/2003 | Ayres et al. .................. 709/217 |
| 2004/0097143 | A1 | 5/2004 | Iwasaki et al. |
| 2004/0117829 | A1* | 6/2004 | Karaoguz et al. ............. 725/46 |
| 2005/0021829 | A1* | 1/2005 | Nomura et al. ............. 709/233 |
| 2005/0076365 | A1* | 4/2005 | Popov et al. .................. 725/46 |
| 2005/0183121 | A1* | 8/2005 | Kim et al. ..................... 725/46 |
| 2005/0204386 | A1* | 9/2005 | Ismail et al. .................. 725/46 |
| 2006/0218226 | A1* | 9/2006 | Johnson et al. ............. 709/202 |
| 2008/0163302 | A1* | 7/2008 | Khedouri et al. ............. 725/46 |
| 2009/0178081 | A1* | 7/2009 | Goldenberg et al. ......... 725/46 |
| 2010/0049608 | A1* | 2/2010 | Grossman ................. 705/14.55 |

FOREIGN PATENT DOCUMENTS

JP   2004264933   9/2004
JP   2005149029   6/2005

OTHER PUBLICATIONS

International Search Report and Written Opinion, Feb. 13, 2007, 11 pages.

* cited by examiner

*Primary Examiner*—Douglas B Blair
*Assistant Examiner*—Benjamin Ailes
(74) *Attorney, Agent, or Firm*—Harrity & Harrity, LLP

(57) ABSTRACT

A contents receiving device may automatically receive contents, and a recording medium may store a contents receiving program. The contents receiving device may refer to an agent table, receive contents having the greatest weight of the agent having the least preference deviation as a top priority from a contents providing server or a P2P network, and store the contents in a contents storage unit. Therefore, the contents receiving device and a device for operating the contents receiving program may automatically download contents satisfying the user's preference. Further, the devices may allow easy finding of user preferences on the contents and similarities on contents preference with respective agents.

17 Claims, 8 Drawing Sheets

[Fig. 2]

| Contents ID | Contents name | Contents status | Total contents capacity | Used contents capacity | Contents weight | Contents intro agent address |
|---|---|---|---|---|---|---|
| 123.201.12.4 | Anycall video | INACTIVE | 5:12 | 0:00 | 0 | 123.23.12.123 |
| ... | ... | ... | ... | ... | ... | ... |
| Vx | Name(Vx) | Status(Vx) | total(Vx) | used(Vx) | W(Vx) | Referal(Vx) |
| ... | ... | ... | ... | ... | ... | ... |
| 221.32.1.105 | Entertainment news | REMOVED | 59:15 | 15:21 | 66 | 78.78.87.78 |

[Fig. 3]

| Agent number | Agent address | Contents list | Preference deviation |
|---|---|---|---|
| $A_1$ | 123.123.12.23 | $V_{1,1}(W_{1,1}), V_{1,2}(W_{1,2}), \cdots V_{1,1000}(W_{1,1000})$ | 6 |
| $A_2$ | 78.78.78.87 | $V_{2,1}(W_{2,1}), V_{2,2}(W_{2,2}), \cdots V_{2,1000}(W_{2,1000})$ | 8 |
| ... | ... | ... | ... |
| $A_j$ | Address($A_j$) | $V_{j,1}(W_{j,1}), V_{j,2}(W_{j,2}), \cdots V_{j,1000}(W_{j,1000})$ | Distance($A_j$) |
| ... | ... | | ... |
| $A_{100}$ | 212.212.21.12 | $V_{100,1}(W_{100,1}), V_{100,1}(W_{100,2}), \cdots V_{100,1000}(W_{100,1000})$ | 56 |

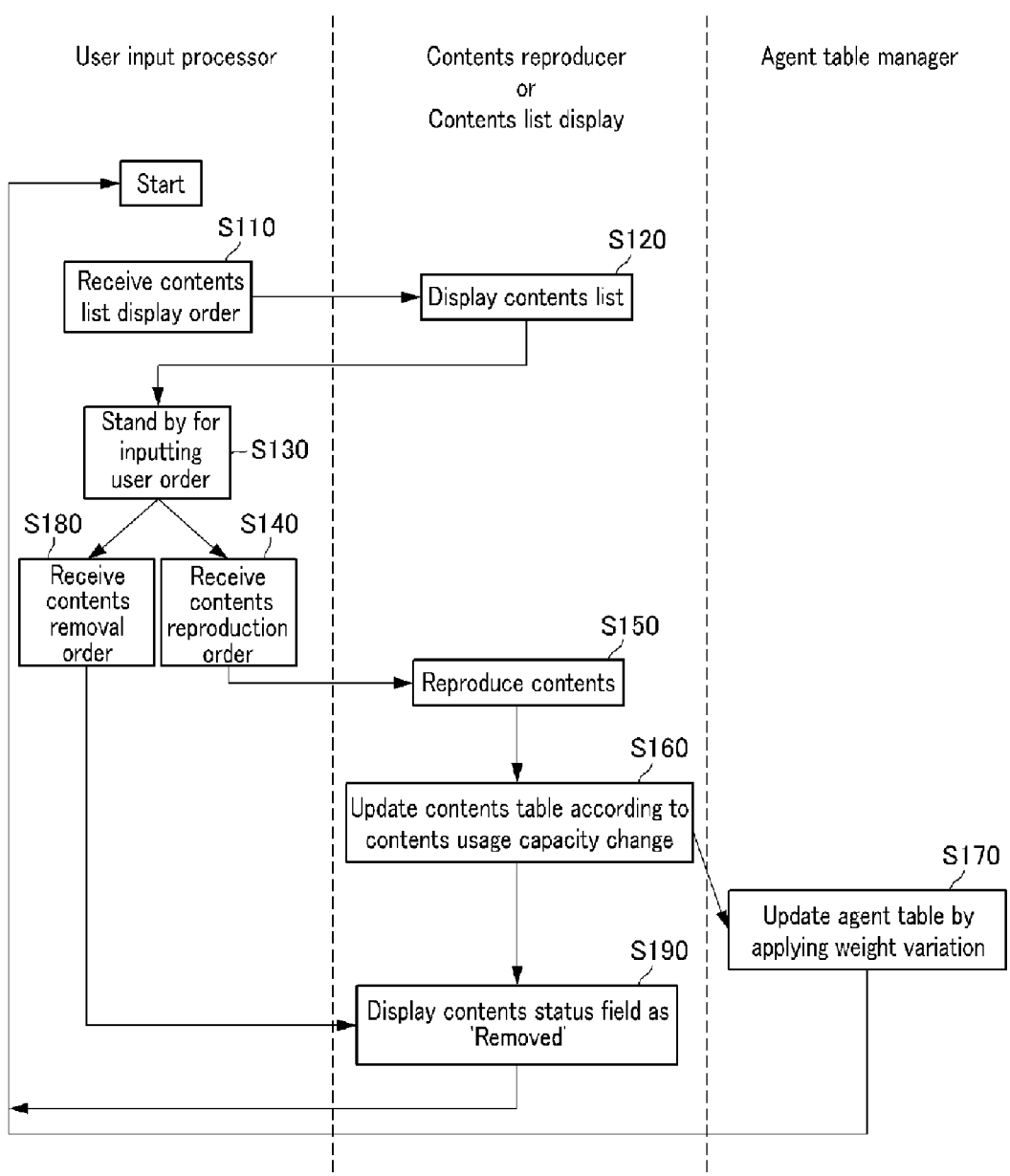
[Fig. 4]

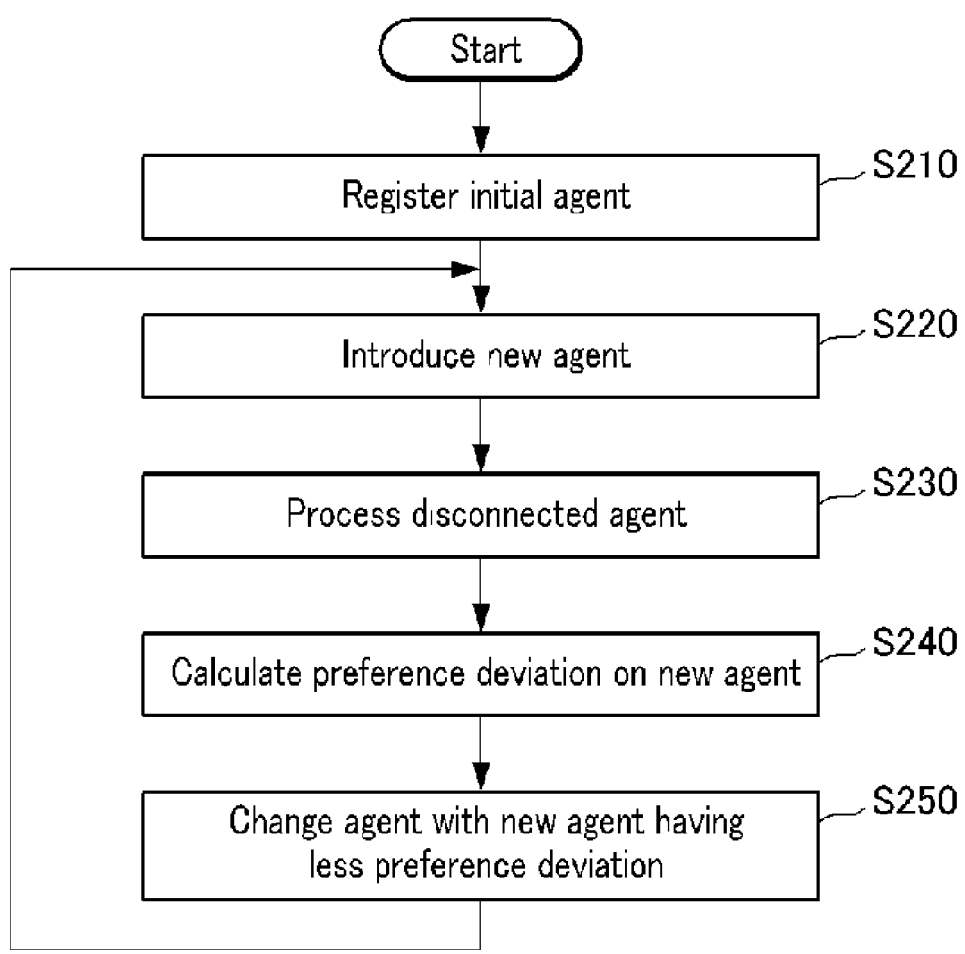
[Fig. 5]

[Fig. 6]
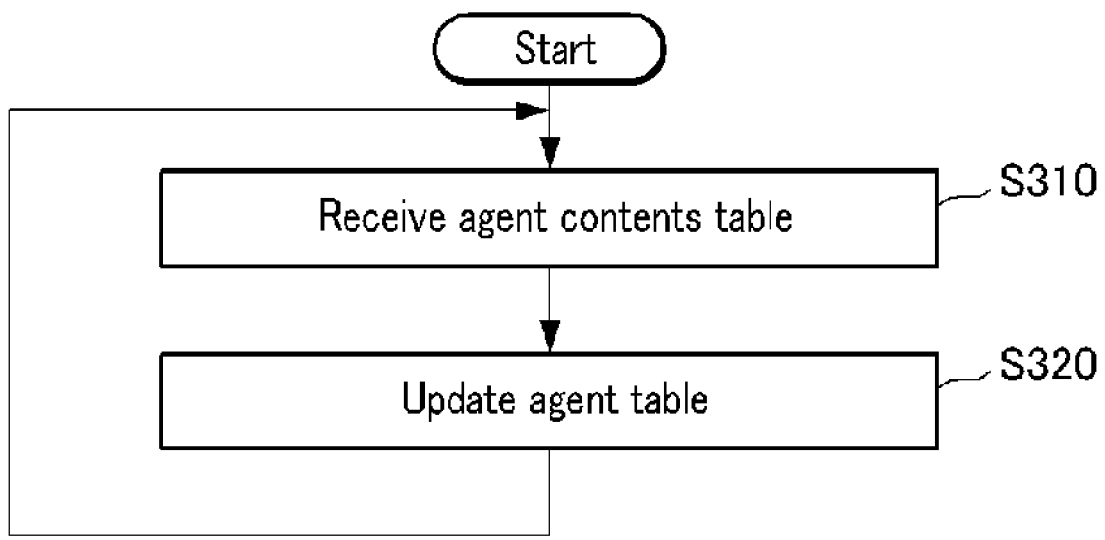

[Fig. 7]
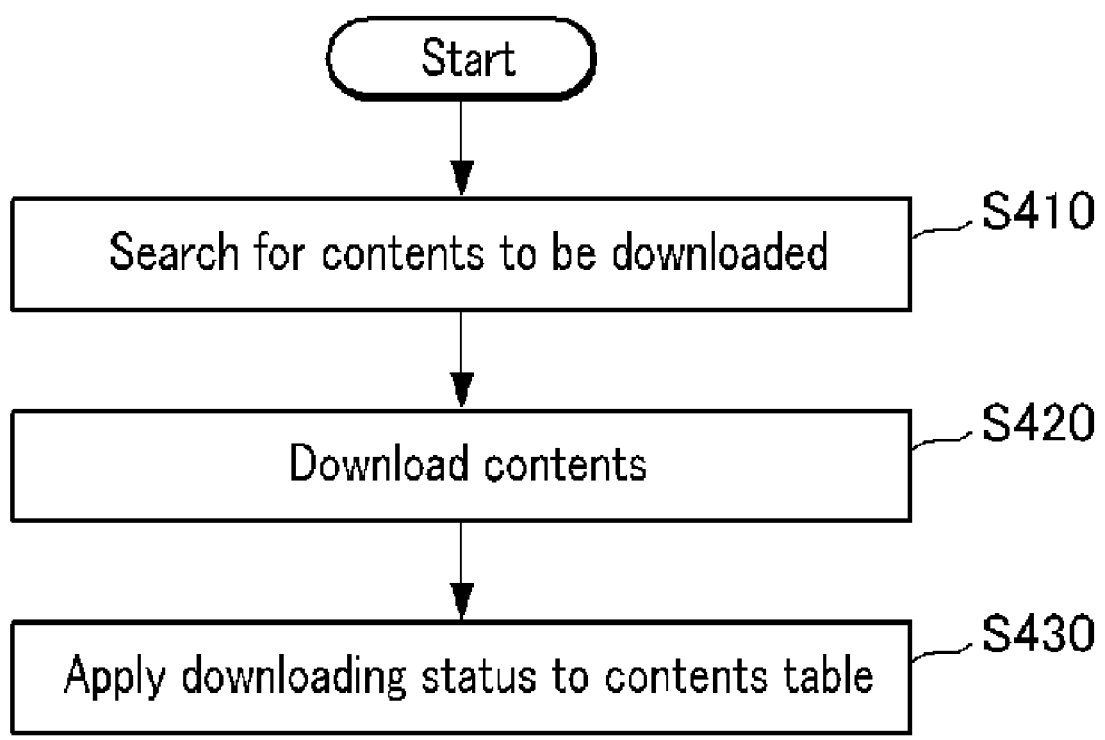

[Fig. 8]
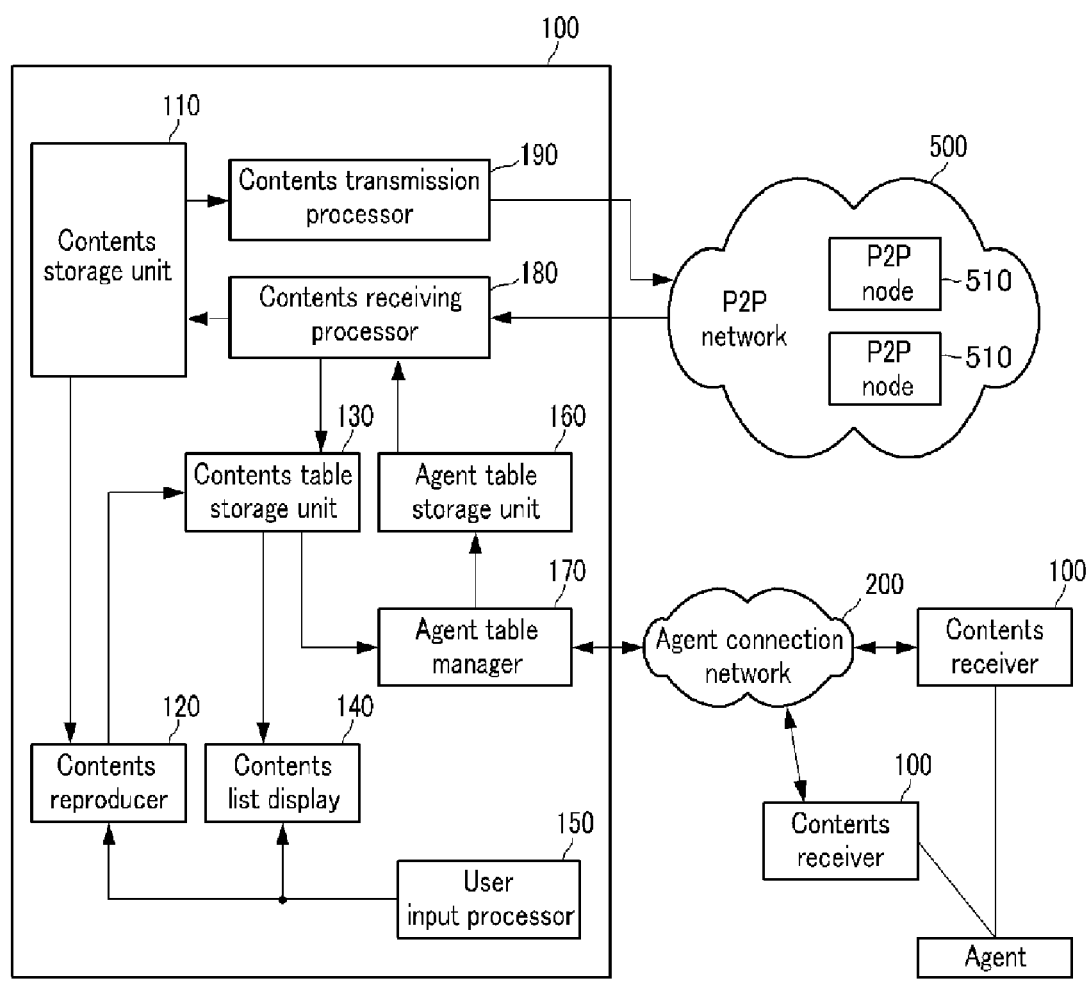

CONTENTS RECEIVING APPARATUS AND RECORDING MEDIUM FOR STORING PROGRAM THEREOF

TECHNICAL FIELD

The present invention relates to a contents receiving device and a storage medium for storing a contents receiving program.

In particular, the present invention relates to a device for automatically downloading contents satisfying user's preference, and a recording medium for storing a program.

BACKGROUND ART

Internet users have come to download and use various types of contents as the Internet has been developed.

A lot of contents providing servers are provided on the Internet, and they provide various contents such as movies, songs, and e-books to the users with or without fees. The user downloads contents from a contents providing server through a user terminal such as a personal computer (PC).

The server-client structure based contents providing method causes the user to directly find a contents providing server for providing contents desired by the user, search desired contents from the contents providing server, and download the same. Also, the user must watch the downloading progress on a large volume of contents, manage a download list, and be authenticated each time so as to download the contents.

The user can access a peer-to-peer (P2P) network so as to receive contents through the Internet. The P2P network includes a plurality of P2P nodes corresponding to PCs, and each P2P node functions as a server or a client to provide the contents to another P2P node and simultaneously receive contents from the other P2P node. The P2P node can improve the downloading rate of one piece of contents by simultaneously downloading the corresponding contents from a plurality of P2P nodes.

The above-noted method for providing contents through the P2P network can realize the server that provides contents desired by the user without the user's search process and without user authentication. However, the user must search for desired contents, continuously monitor the downloading progress status, and manage the download list.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a device for automatically downloading contents satisfying the user's preference and a recording medium for storing a program.

Technical Solution

In one aspect of the present invention, a contents receiving device for downloading contents from a contents providing server includes: a contents storage unit for storing contents; a contents table storage unit for storing a contents table including a list of contents stored in the contents storage unit and weight information for indicating a contents user's preference on the respective contents; an agent table storage unit for storing an agent table including a list of agents sharing the weight information and preference deviation information on the contents for the respective agents; an agent table manager for updating preference deviation information of the agent table; and a contents receiving processor for referring to the agent table, receiving contents having the greatest weight of the agent having the least preference deviation as a top priority from the contents providing server, and storing the same contents.

In another aspect of the present invention, a contents receiving device for downloading contents from a peer-to-peer (P2P) network including a plurality of P2P nodes includes: a contents storage unit for storing contents; a contents table storage unit for storing a contents table including a list of contents stored in the contents storage unit and weight information for indicating a contents user's preference on the respective contents; an agent table storage unit for storing an agent table including a list of agents sharing the weight information and preference deviation information on the contents for the respective agents; an agent table manager for updating preference deviation information of the agent table; and a contents receiving processor for referring to the agent table, receiving contents having the greatest weight of the agent having the least preference deviation as a top priority from the P2P network, and storing the same contents.

In another aspect of the present invention, a recording medium for storing a program for storing contents received from a contents providing server into a contents storage unit includes functions of: storing a contents table including a list of contents stored in the contents storage unit and weight information for indicating a preference degree of a contents user on the respective contents; storing an agent table including a list of agents sharing the weight information and preference deviation information on the respective contents of the agents; updating preference deviation information of the agent table by using the difference between weight information of the contents table and weight information of contents possessed by the agent; and referring to the agent table, receiving contents having the greatest weight of the agent having the least preference deviation as a top priority from the contents providing server, and storing the same contents in the contents storage unit.

In another aspect of the present invention, a recording medium for storing a program for storing contents received from a peer-to-peer (P2P) network including a plurality of P2P nodes into a contents storage unit includes functions of: storing a contents table including a list of contents stored in the contents storage unit and weight information for indicating a preference degree of a contents user on the respective contents; storing an agent table including a list of agents sharing the weight information and preference deviation information on the respective contents of the agents; updating preference deviation information of the agent table by using the difference between weight information of the contents table and weight information of contents possessed by the agent; and referring to the agent table, receiving contents having the greatest weight of the agent having the least preference deviation as a top priority from the P2P network, and storing the same contents in the contents storage unit.

BRIEF DESCRIPTION OF THE DRAWINGS

FIG. 2 shows a contents table according to an embodiment of the present invention.

FIG. 3 shows an agent table according to an embodiment of the present invention.

FIG. 4 shows a flowchart for a contents table management method according to an embodiment of the present invention.

FIG. 5 shows a flowchart of a method for registering an agent in an agent table according to an embodiment of the present invention.

FIG. 6 shows a flowchart for an agent table update method according to an embodiment of the present invention.

FIG. 7 shows a method for a contents receiving device to receive contents according to an embodiment of the present invention.

FIG. 8 shows a configuration and installation condition for a contents receiving device according to a second embodiment of the present invention.

BEST MODE FOR CARRYING OUT THE INVENTION

Figure 1:
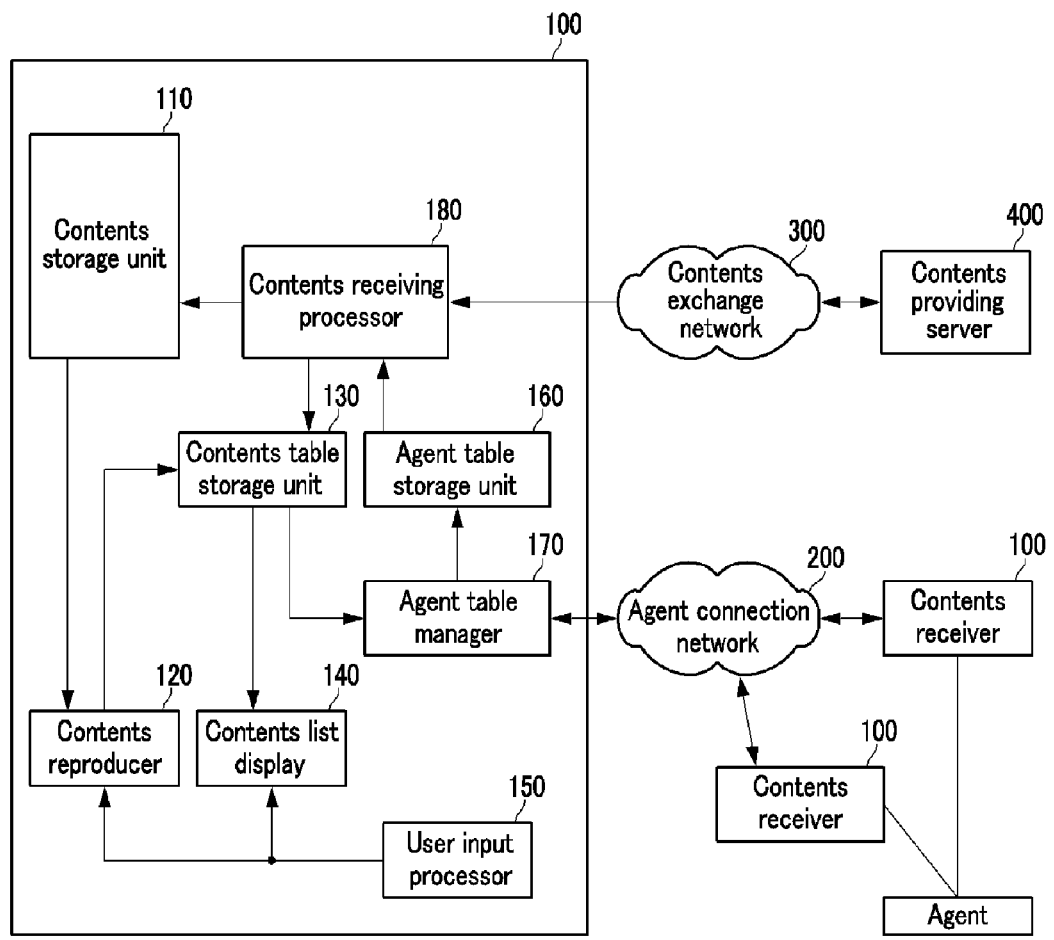
FIG. 1 shows a configuration and installation condition for a contents receiving device according to a first embodiment of the present invention.

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. In the drawings, parts that do not relate to descriptions will be omitted so as to clarify the embodiments of the present invention, and similar parts have similar reference numerals over the specification.

In the embodiments of the present invention, the contents represent digital information provided through various wired/wireless communication networks, including application programs, movies, songs, game software, and digital photographs.

Referring to FIG. 1, a contents receiving device 100 according to an embodiment of the present invention will be described.

FIG. 1 shows a configuration and installation condition for a contents receiving device 100 according to a first embodiment of the present invention.

As shown in FIG. 1, the contents receiving apparatus 100 is connected to a plurality of contents receiving devices 100 through an agent connection network 200, and is connected to a contents providing server 400 through a contents exchange network 300.

The contents receiving device 100 receives contents from the contents providing server 400 through the contents exchange network 300.

The contents providing server 400 provides contents to the contents receiving device 100 with or without fees in response to the contents request by the contents receiving device 100.

The agent connection network 200 represents a network on which agents are connected. In this instance, the agent represents the contents receiving device 100. Other contents receiving devices 100 connected to a specific contents receiving device 100 through the agent connection network 200 will be referred to as agents. That is, the contents receiving device 100 exchanges an agent table and a contents table with the agents through the agent connection network 200.

The contents exchange network 300 represents a route through which the contents receiving device 100 receives contents from the contents providing server 400. The contents exchange network 300 and the agent connection network 200 are illustrated to be physically independent, and they may be the same network.

As shown in FIG. 1, the contents receiving device 100 includes a contents storage unit 110, a contents reproducer 120, a contents table storage unit 130, a contents list display 140, a user input processor 150, an agent table storage unit 160, an agent table manager 170, and a contents receiving processor 180.

The contents storage unit 110 stores the contents from the contents providing server 400.

The contents reproducer 120 reproduces the contents stored in the contents storage unit 110 through reproduction media such as a display or a speaker. That is, the contents reproducer 120 reproduces the contents through the speaker when the contents are songs, the contents reproducer 120 reproduces the contents through the display when the contents are images, and the contents reproducer 120 reproduces the contents through the display and the speaker when the contents are movies. The contents receiving device 100 can have the display and/or the speaker as built-in devices, and the same can be connected to an external display and/or an external speaker.

The contents table storage unit 130 stores a contents table which is shown in FIG. 2.

FIG. 2 shows a contents table according to an embodiment of the present invention.

As shown in FIG. 2, the contents table includes information on a plurality of contents, and in detail, it includes a contents identifier field, a contents name field, a contents state field, a entire contents capacity field, a contents usage capacity field, a contents weight field, a contents introduction agent address field.

The contents identifier field is identification information for identifying corresponding contents from other contents. Values of the contents identifier field can be generated by extracting a specific bit pattern in the corresponding contents.

The contents name field represents information on the contents name, for example, a file name of the contents.

The contents state field represents state information on the corresponding contents, including an active state value, an inactive state value, and a removed state value. In this instance, the active state indicates the state in which the user reproduced the corresponding contents, the inactive state indicates the state in which the user did not reproduce the corresponding contents, and the removed state indicates the state in which the corresponding contents are removed from the contents storage unit 110.

The entire contents capacity field represents information on the entire file size or the running time of the contents. That is, the entire contents capacity field can be a contents running time when the contents are songs or movies, and the same can be a number of images or image sizes when the contents are images.

The contents usage capacity field indicates a usage degree on the corresponding contents. That is, the contents usage capacity field can be a viewing time when the contents are songs or movies, and the same can be a number of viewed images when the contents are images.

The contents weight field indicates a degree of the user's interest or preference on the corresponding contents. An example of calculating the contents weight field is given in Math Figure 1.

$$W(Vx) = \frac{used(Vx)}{total(Vx)} \times 256 \qquad \text{MathFigure 1}$$

As given in Math Figure 1, the contents weight field value (W) calculated within the range of 1 byte with the rate of the total amount and the used amount of the corresponding contents (Vx). Therefore, the contents reproducer 120 applies a reproduction degree to a contents weight field of the corresponding contents while reproducing the contents.

The contents introduction agent address represents an address of the agent having introduced the corresponding contents so as to download the contents.

The contents list display 140 receives a contents table from the contents table storage unit 130 and displays the contents list stored in the contents storage unit 110 through a display device. Accordingly, the user can easily select the contents to be reproduced. Also, the contents list display 140 receives the contents table and displays the contents list in the order of the contents weight fields included in the contents table. Therefore, the user can easily select desired contents through the list that displays contents with higher interests on the higher level.

The user input processor 150 receives user inputs and controls the contents receiving device 100 to perform a specific operation. That is, the user input processor 150 controls the contents list display 140 to display the contents list when receiving the contents list display order, and controls the contents reproducer 120 to reproduce the corresponding contents when receiving the contents reproduction order.

The agent table storage unit 160 stores the agent table that is illustrated in FIG. 3.

FIG. 3 shows an agent table according to an embodiment of the present invention.

As shown in FIG. 3, the agent table includes information on a plurality of agents agent number fields for the respective agents, agent address fields, contents list fields, and preference deviation fields.

The agent number fields indicate numbers assigned to corresponding agents. The agent address fields indicate addresses of corresponding agents, and are expressed by IP addresses.

The contents list fields indicate information on the contents list included by corresponding agents and weights. Particularly, the contents list fields can show the list of contents that have relatively high contents weight fields.

The preference deviation fields indicate information on differences of preferences between the user of the corresponding agent and the user of the contents receiving device 100. The contents receiving device 100 can find the agent with a preference that is the most closest to that of the contents receiving device 100 from the preference deviation field, and download the contents from the searched agent through a recommendation. The preference deviation fields can be calculated from the weight field of contents included by the corresponding agent and the contents receiving device 100, which is exemplified in Math Figure 2.

$$\text{Distance}(A_j) = \frac{1}{n}\sum_{i=1}^{n} |W_j(V_i) - W(V_i)| \qquad \text{MathFigure 2}$$

The contents (Vi, i=1, 2, . . . , n) are included by the agent(Aj) and the contents receiving device 100, Wj(Vi) represents a weight field value of the agent(Aj) on the contents (Vi), and W(Vi) represents a weight field value of the contents receiving device 100 on the contents (Vi).

As given in Math Figure 2, the preference deviation field distance of a specific agent(Aj) is an average id weight field values of contents included by the agent(Aj) and the contents receiving device 100. It can be determined that the lesser the preference deviation field distance becomes, the more similar the preference between the corresponding agent and the contents receiving device 100 is, and the greater the preference deviation field distance becomes, the more different the preference between the corresponding agent and the contents receiving device 100 becomes.

The agent table manager 170 updates the agent table stored in the agent table storage unit 160. That is, the agent table manager 170 manages the agent list and updates the agent's preference deviation field.

The contents receiving processor 180 refers to the agent table stored in the agent table storage unit 160 to download the contents with the highest weight of the agent with the most similar preference. When the contents receiving processor 180 has already stored the contents with the highest priority or cannot download the contents, the contents receiving processor 180 downloads contents with next highest priority.

The contents receiving processor 180 can download a plurality of contents when the same has other bandwidths for downloading the contents. Therefore, the bandwidths for downloading contents can be efficiently allocated. The contents receiving processor 180 applies status information on the contents downloading to the contents table of the contents table storage unit 130.

A contents table management method by the contents receiving device 100 according to an embodiment of the present invention will now be described with reference to FIG. 4.

FIG. 4 shows a flowchart for a contents table management method according to an embodiment of the present invention.

A method for reproducing contents by the contents receiving device 100 will now be described.

When the user input processor 150 receives a contents list display order (S110), the contents list display 140 displays the contents list through a display device (S120). In this instance, the contents list display 140 displays the contents list according to the order of weights so that the user may easily select the contents.

The user input processor 150 stands by for the user's inputting an order (S130), and controls the contents reproducer 120 to reproduce the contents when receiving a reproduction order (S140). That is, the contents reproducer 120 receives the corresponding contents from the contents storage unit 110 and reproduces the same through a display device (S150). The contents reproducer 120 calculates again the contents weight field according to the corresponding contents' changed usage amount to update the contents table (S160).

When the contents table is updated, the agent table manager 170 updates the agent table (S170). That is, the agent table manager 170 applies changes of the contents weight fields of the contents table to calculate again the agent table's preference deviation field and apply the same.

When the user input processor 150 receives a contents removal order for specific contents during an order standby status (S130), the contents reproducer 120 removes the corresponding contents (S180), and displays the contents table's contents status field as 'removed' (S190).

A method for registering an agent to the agent table by the contents receiving device 100 will now be described with reference to FIG. 5.

FIG. 5 shows a flowchart for registering an agent to the agent table according to an embodiment of the present invention.

When the agent table is in the initial stage, the agent table manager 170 randomly probes the agent connection network 200 or receives an agent list from a pre-determined agent to register the initial agent (S210).

The agent table manager 170 is introduced with at least one new agent by a registered agent (S220), increases the preference deviation of a disconnected agent by 1 (S230), and calculates the preference deviation of each new agent (S240).

The agent table manager 170 changes the registered agent having a preference deviation greater than that of the new agent with the new agent (S250).

A method for updating the agent table by the contents receiving device 100 will now be described with reference to FIG. 6.

FIG. 6 shows a flowchart for an agent table updating method according to an embodiment of the present invention.

The agent table manager 170 periodically receives a contents table from an agent through the agent connection network 200 (S310).

The agent table manager 170 updates the agent table of the corresponding agent through the contents table according to Math Figure 2 (S320).

A method for receiving contents by the contents receiving device 100 will now be described with reference to FIG. 7.

FIG. 7 shows a contents receiving method by the contents receiving device 100 according to an embodiment of the present invention.

The contents receiving processor 180 refers to the agent table to check whether the contents having the highest weight of the agent having the most similar preference can be downloaded (S410). The contents receiving processor 180 probes contents of the next order when the contents cannot be downloaded or are stored in the contents storage unit 110.

The contents receiving processor 180 downloads the corresponding contents (S420).

The contents receiving processor 180 applies to the contents download status to the contents table (S430).

FIG. 8 shows a configuration and installation condition for a contents receiving device 100 according to a second embodiment of the present invention.

As shown in FIG. 8, the contents receiving device 100 is connected to a plurality of contents receiving devices 100 that is agents through the agent connection network 200, and is connected to the P2P network 500.

As shown in FIG. 8, the P2P network 500 includes a plurality of P2P nodes 510. The P2P nodes 510 exchange contents with each other.

As shown in FIG. 8, the contents receiving device 100 includes a contents storage unit 110, a contents reproducer 120, a contents table storage unit 130, a contents list display 140, a user input processor 150, an agent table storage unit 160, and an agent table manager 170, functions of which correspond to those of the contents receiving device 100 shown in FIG. 1, and hence, no detailed description thereof will be provided.

The contents receiving device 100 further includes a contents receiving processor 180. The contents receiving processor 180 receives contents from the P2P network 500, differing from the first embodiment of the present invention.

The contents receiving device 100 further includes a contents transmission processor 190. The contents transmission processor 190 provides corresponding contents to the P2P node 510 when receiving a contents request from the P2P node 510. That is, the contents receiving device 100 including the contents transmission processor 190 can also function as the P2P node 510.

The above-described embodiments of the present invention are realized not only by the method and device apparatus but also by a program for realizing the functions that correspond to the configuration of the embodiments of the present invention or a recording medium recording the program, which is easily realized by a skilled person from the above-described embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the present invention, the contents receiving device and the device for operating the contents receiving program downloads contents satisfying the user and the user's preference.

Also according to the present invention, the contents receiving device and the device for operating the contents receiving program can be P2P nodes.

According to the present invention, the contents receiving device and the device for operating the contents receiving program provide objective references for digitalizing the user preferences by using the rate of used contents amounts with reference to the total contents so as to digitalize the user preferences on specific contents.

In addition, the contents receiving device and the device for operating the contents receiving program can easily find the similarity of preferences with agents by applying the concept of preference deviation.

The invention claimed is:

1. A contents receiving device for downloading contents from a contents providing server in a peer-to-peer (P2P) network, the device comprising:
   a contents storage unit for storing contents;
   a contents table storage unit for storing a contents table including a list of contents stored in the contents storage unit and weight information for indicating a content user's preference on the respective contents;
   an agent table storage unit for storing an agent table including a list of agents sharing the weight information and preference deviation information on the contents for the respective agents,
      where the preference deviation information is generated based on differences between values corresponding to weight information of an agent for contents and values corresponding to weight information of the contents receiving device for the-contents;
   an agent table manager for updating preference deviation information of the agent table; and
   a contents receiving processor for referring to the agent table, selecting an agent having a least preference deviation from the list of agents, receiving contents having a greatest weight among a plurality of contents of the selected agent as a top priority from the contents providing server, and storing the received contents.

2. The contents receiving device of claim 1, further comprising a contents reproducer for reproducing the contents stored in the contents storage unit and applying a reproduction degree of the corresponding contents of weight information of the contents table.

3. The contents receiving device of claim 1, where the agent table manager updates preference deviation information of the agent table by using the difference between weight information of the contents table and weight information of the contents possessed by the agent.

4. The contents receiving device of claim 1, where the agent table manager calculates a preference deviation on a new agent, and changes the agent on a list of the agent table that has a preference deviation greater than that of the new agent with the new agent.

5. The contents receiving device of claim 1, further comprising a contents list display for displaying a list of contents included in the contents table to a display device.

6. The contents receiving device of claim 5, where the contents list display displays the list of contents included in the contents table according to an order of weight information.

7. The contents receiving device of claim 1, where the weight information is calculated based on a rate of a total amount and a used amount of corresponding contents, and a reproduction degree is applied to the weight information while reproducing the contents,
where the preference deviation information is generated based on differences of contents included by the agent and the contents receiving device.

8. A contents receiving device for downloading contents from a peer-to-peer (P2P) network including a plurality of P2P nodes, the device comprising:
a contents storage unit for storing contents;
a contents table storage unit for storing a contents table including a list of contents stored in the contents storage unit and weight information for indicating a content user's preference on the respective contents;
an agent table storage unit for storing an agent table including a list of agents sharing the weight information and preference deviation information on the contents for the respective agents,
where the preference deviation information is generated based on differences between values corresponding to weight information of an agent for contents and values corresponding to weight information of the contents receiving device for the-contents;
an agent table manager for updating preference deviation information of the agent table; and
a contents receiving processor for referring to the agent table, selecting an agent having a least preference deviation from the list of agents, receiving contents having a greatest weight among a plurality of contents of the selected agent as a top priority from the P2P network, and storing the received contents.

9. The contents receiving device of claim 8, further comprising a contents transmission processor for providing the contents of the P2P node in response to the request of providing contents stored in the contents storage unit from P2P node.

10. The contents receiving device of claim 8, where the weight information is calculated based on the rate of a total amount and a used amount of corresponding contents, and a reproduction degree is applied to the weight information while reproducing the contents,
where the preference deviation information is generated based on differences of contents included by the agent and the contents receiving device.

11. A non-transitory recording medium for storing a program for storing contents received from a contents providing server into a contents storage unit in a peer-to-peer (P2P) network, the non-transitory recording medium comprising functions of:
storing a contents table including a list of contents stored in the contents storage unit and weight information for indicating a preference degree of a contents user on the respective contents;
storing an agent table including a list of agents sharing the weight information and preference deviation information on the respective contents of the agents,
where the preference deviation information is generated based on differences between values corresponding to weight information of an agent for contents and values corresponding to weight information of the recording medium for the contents;
updating preference deviation information of the agent table by using the difference between weight information and the contents table, and weight information of contents possessed by the agent;
referring to the agent table, selecting an agent having a least preference deviation from the list of agents; and
receiving contents having a greatest weight among a plurality of contents of the selected agent as a top priority from the contents providing server, and storing the received contents in the contents storage unit.

12. The recording medium of claim 11, further comprising reproducing the contents stored in the contents storage unit to a contents reproducer, and applying the reproduction degree of the corresponding contents to weight information of the contents table.

13. The recording medium of claim 11, further comprising updating a list of agents included in the agent table according to an order having the agent of the least preference deviation as a top priority.

14. The recording medium of claim 11, further comprising displaying the list of contents included in the contents table to a display device according to an order of weight information of corresponding contents.

15. The recording medium of claim 11, where the weight information is calculated based on a rate of a total amount and a used amount of corresponding contents, and a reproduction degree is applied to the weight information while reproducing the contents,
where the preference deviation information is generated based on differences of contents included by the agent and the recording medium.

16. A non-transitory recording medium for storing a program for storing contents received from a peer-to-peer (P2P) network including a plurality of P2P nodes into a contents storage unit, the non-transitory recording medium comprising functions of:
storing a contents table including a list of contents stored in the contents storage unit and weight information for indicating a preference degree of a contents user on the respective contents
where the weight information is calculated based on a rate of a total amount and a used amount of corresponding contents, and where a reproduction degree is applied to the weight information while reproducing the contents;
storing an agent table including a list of agents sharing the weight information and preference deviation information on the respective contents of the agents,
where the preference deviation information is generated based on:
differences between values corresponding to weight information of an agent for contents and values corresponding to weight information of the recording medium for the contents, and
differences of contents included by the agent and the recording medium;

updating preference deviation information of the agent table by using the difference between weight information and the contents table, and weight information of contents possessed by the agent;

referring to the agent table, selecting an agent having a least preference deviation from the list of agents; and receiving contents having a greatest weight among a plurality of contents of the selected agent as a top priority from the P2P network, and storing the received contents in the contents storage unit.

17. The recording medium of claim 16, further comprising providing contents to the P2P node in response to the request of providing contents stored in the contents storage unit from the P2P node.

* * * * *

UNITED STATES PATENT AND TRADEMARK OFFICE
CERTIFICATE OF CORRECTION

PATENT NO. : 7,870,186 B2  Page 1 of 1
APPLICATION NO. : 11/576754
DATED : January 11, 2011
INVENTOR(S) : Tae-Ha Park It is certified that error appears in the above-identified patent and that said Letters Patent is hereby corrected as shown below:

In Claim 10, at column 9, line 56, delete "the rate" and insert --a rate--.

Signed and Sealed this
Nineteenth Day of April, 2011

David J. Kappos
*Director of the United States Patent and Trademark Office*